R. C. ANNAND.
APPARATUS FOR THE PRODUCTION OF CURVED STEREOTYPE PLATES.
APPLICATION FILED MAY 26, 1915.

1,185,162.

Patented May 30, 1916.
13 SHEETS—SHEET 1.

Inventor:
Robert Cumming Annand
By Attorneys
Fraser, Trick & Myers

R. C. ANNAND.
APPARATUS FOR THE PRODUCTION OF CURVED STEREOTYPE PLATES.
APPLICATION FILED MAY 26, 1915.

1,185,162.

Patented May 30, 1916.
13 SHEETS—SHEET 2.

Figure 1:
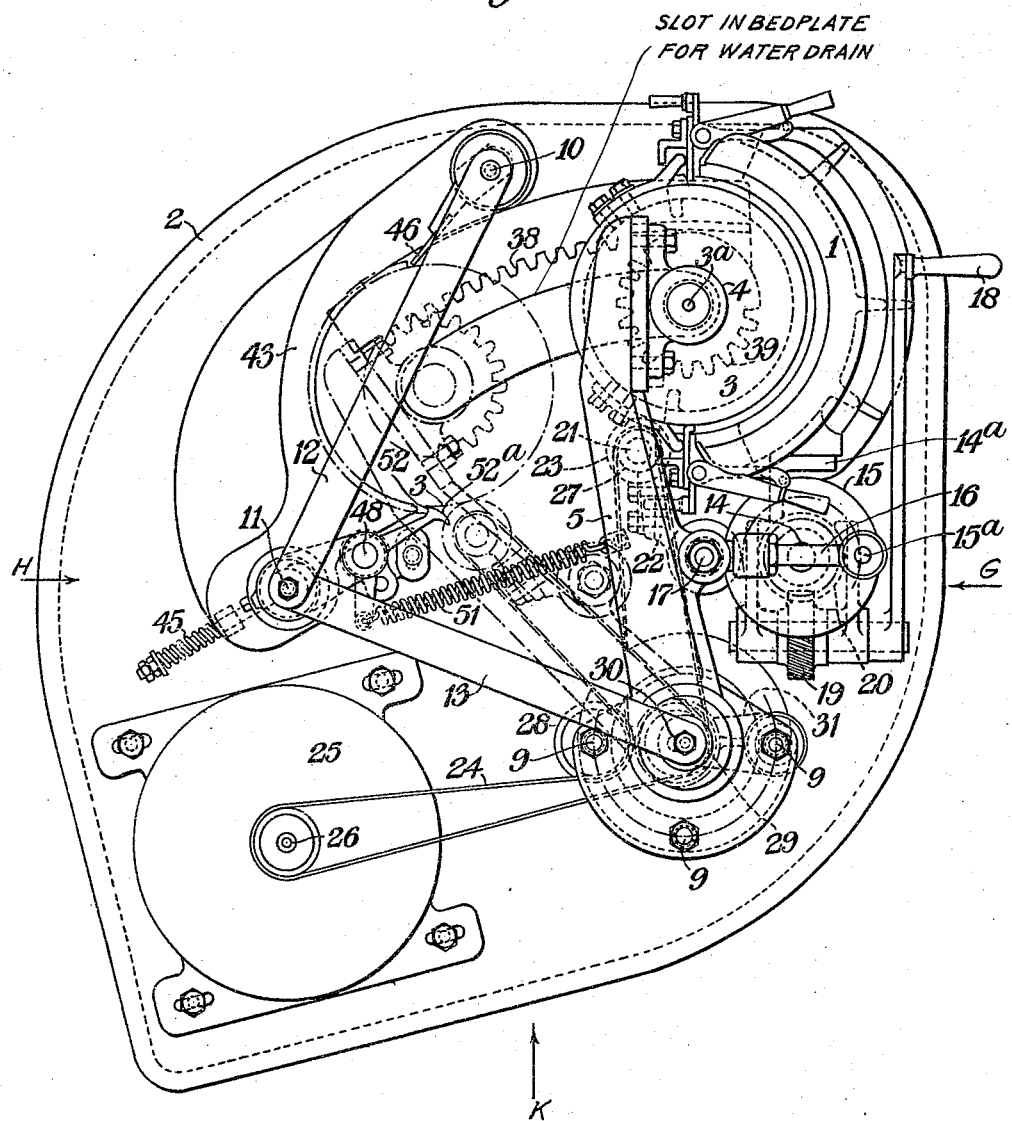

Looking on G. Fig. 1.

Inventor:
Robert Cumming Annand
By Attorneys
Fraser, Turk & Myers

R. C. ANNAND.
APPARATUS FOR THE PRODUCTION OF CURVED STEREOTYPE PLATES.
APPLICATION FILED MAY 26, 1915.

1,185,162.

Patented May 30, 1916.
13 SHEETS—SHEET 3.

LOOKING ON H. Fig. 1.

Inventor:
Robert Cumming Annand
By Attorneys
Fraser, Turk & Myers

R. C. ANNAND.
APPARATUS FOR THE PRODUCTION OF CURVED STEREOTYPE PLATES.
APPLICATION FILED MAY 26, 1915.

1,185,162.

Patented May 30, 1916.
13 SHEETS—SHEET 4.

LOOKING ON K. Fig. 1.

Inventor:-
Robert Cumming Annand
By Attorneys
Fraser Turk & Myers

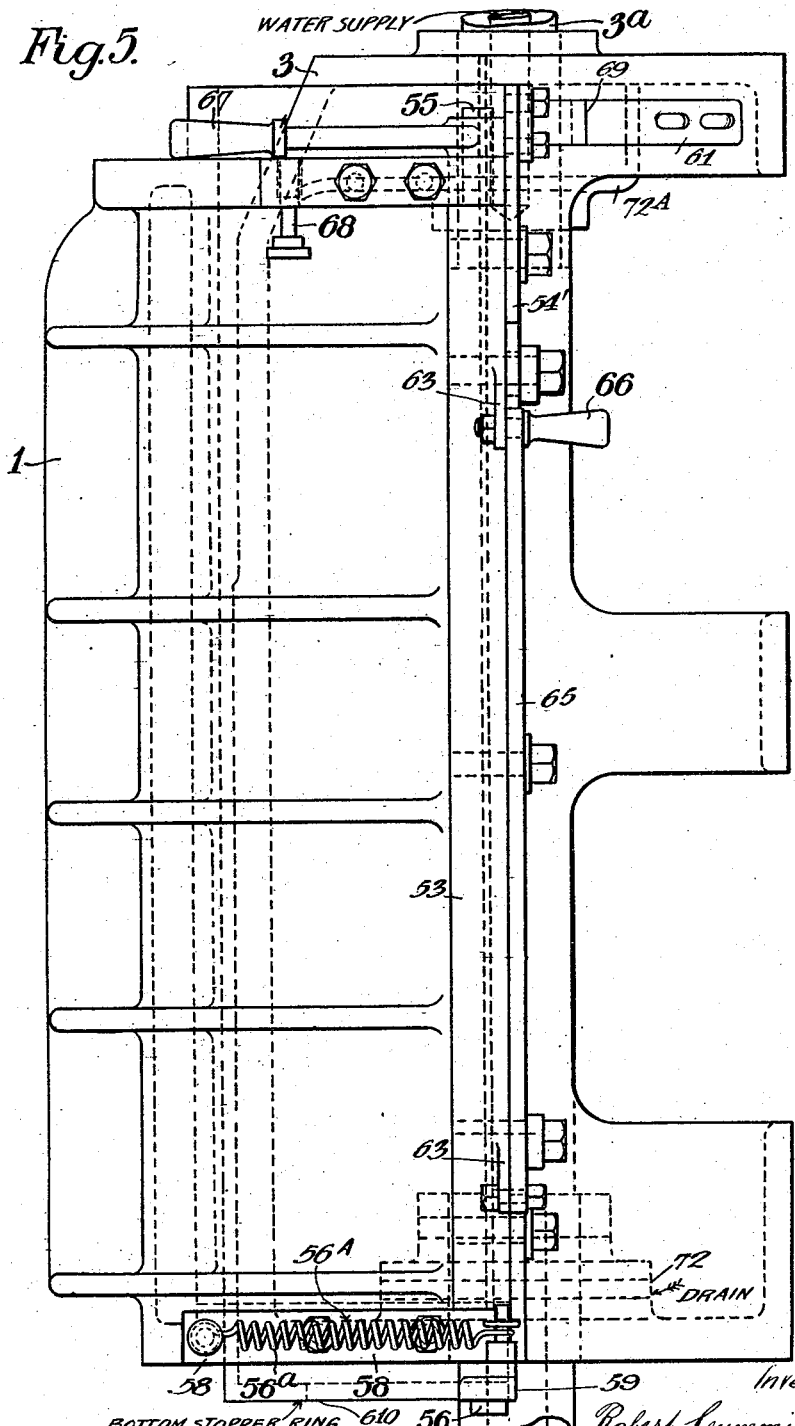

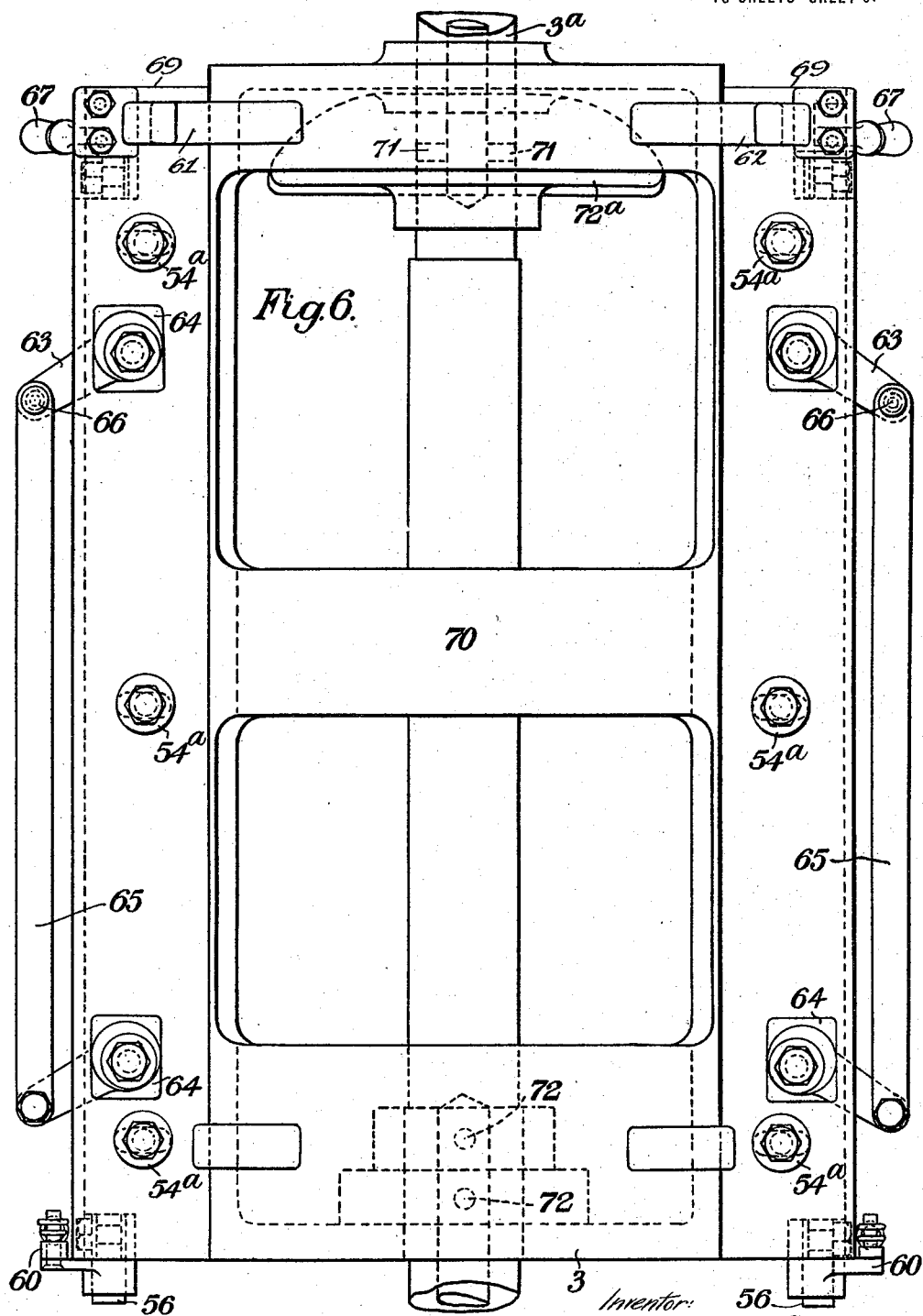

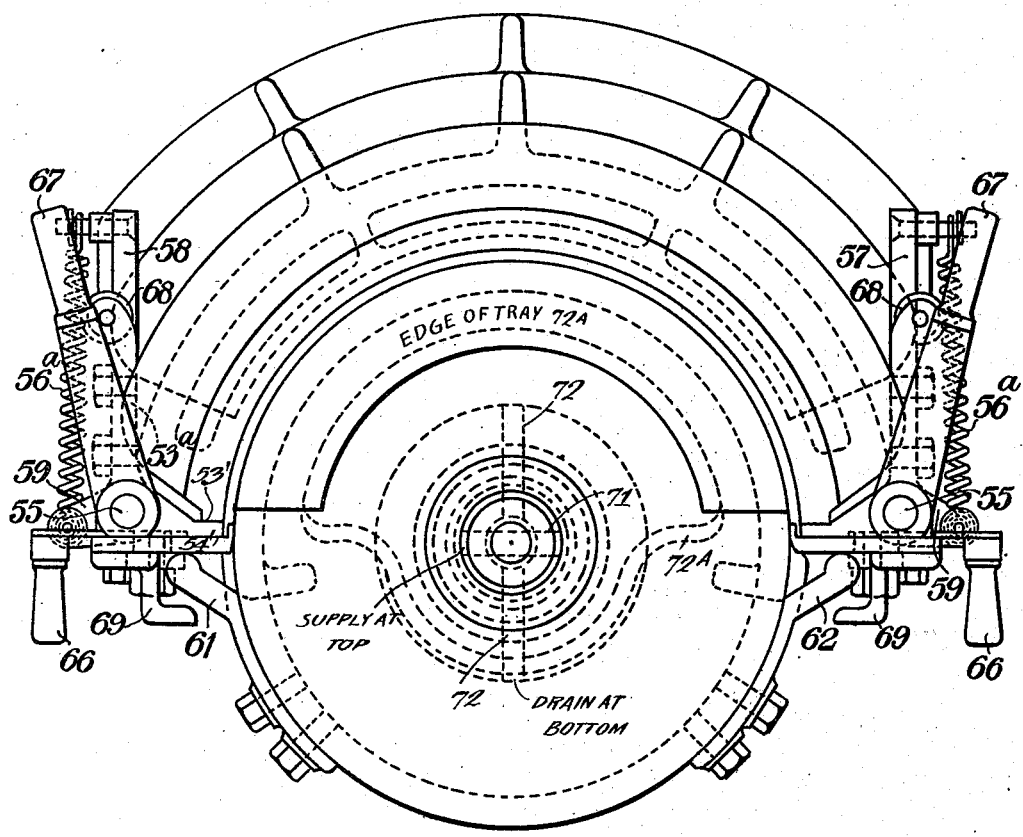

R. C. ANNAND.
APPARATUS FOR THE PRODUCTION OF CURVED STEREOTYPE PLATES.
APPLICATION FILED MAY 26, 1915.
1,185,162.
Patented May 30, 1916.
13 SHEETS—SHEET 8.
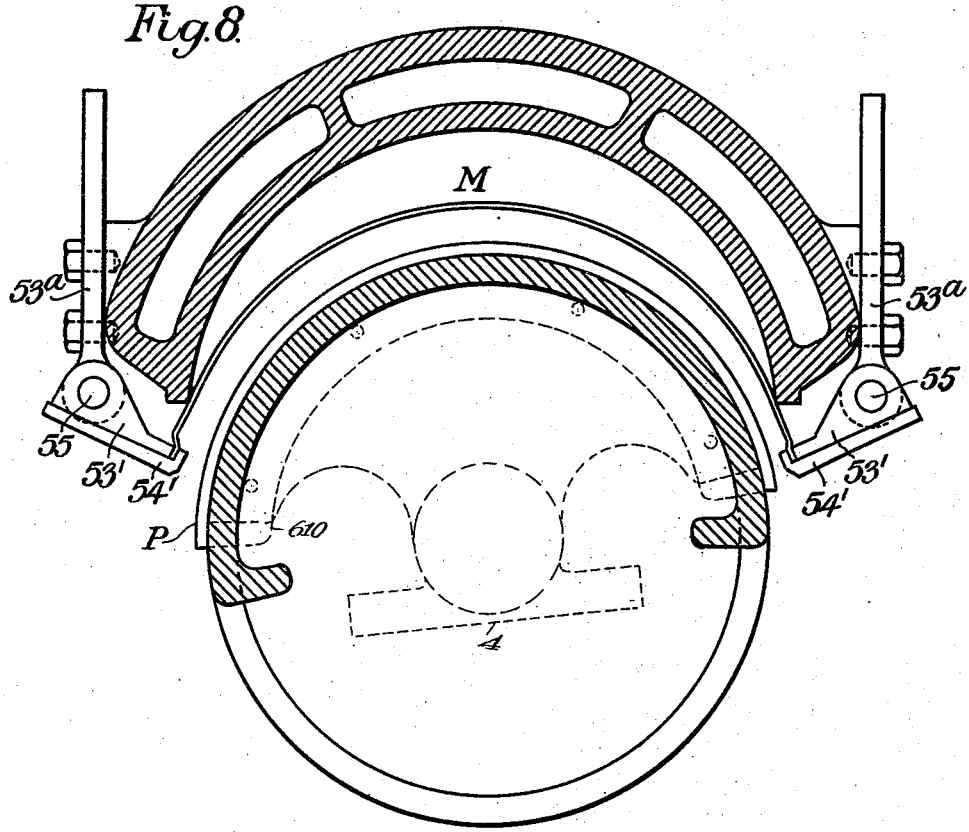
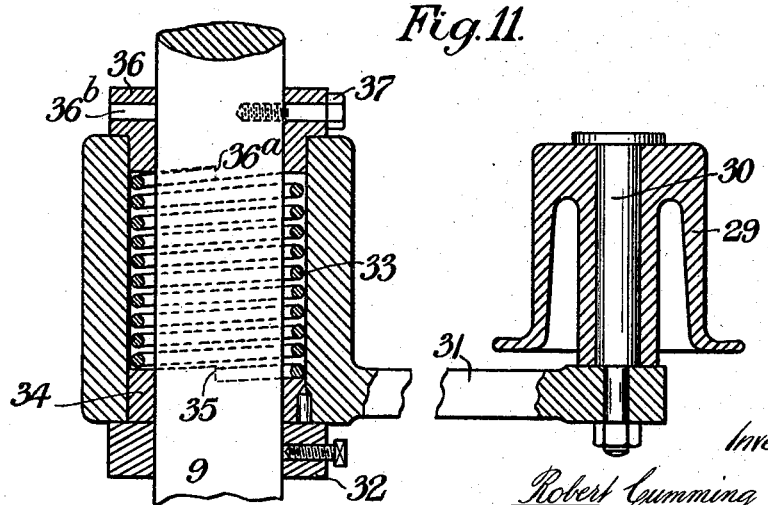
Inventor:
Robert Cumming Annand
By Attorneys
Fraser, Turk & Myers

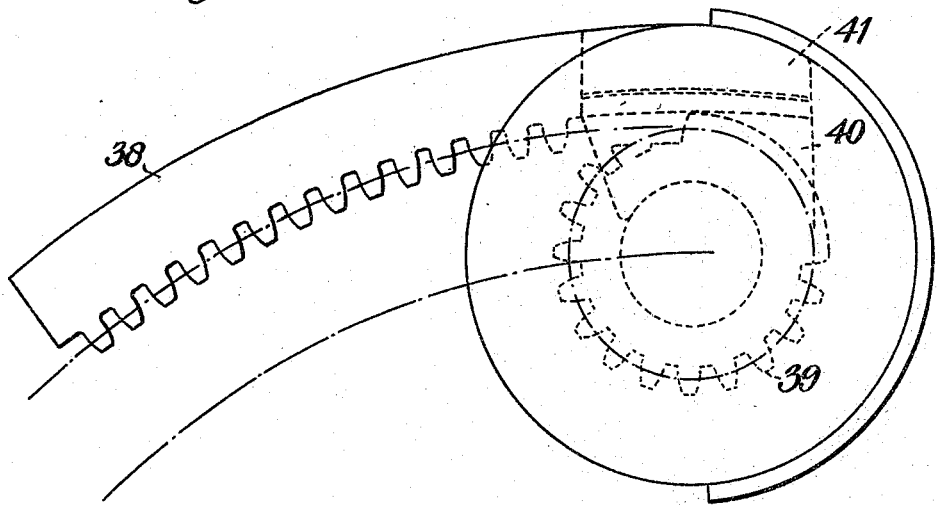
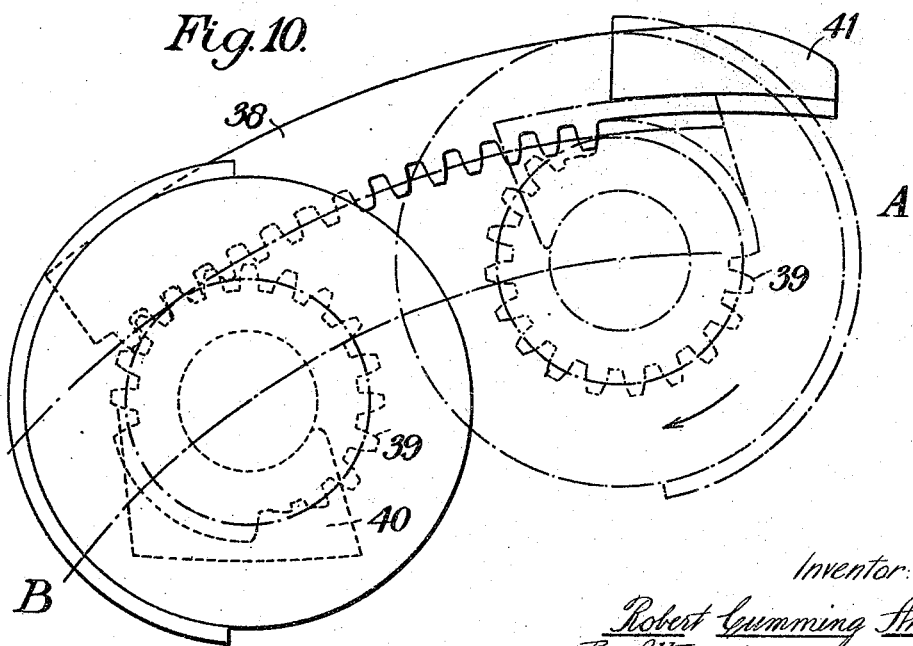

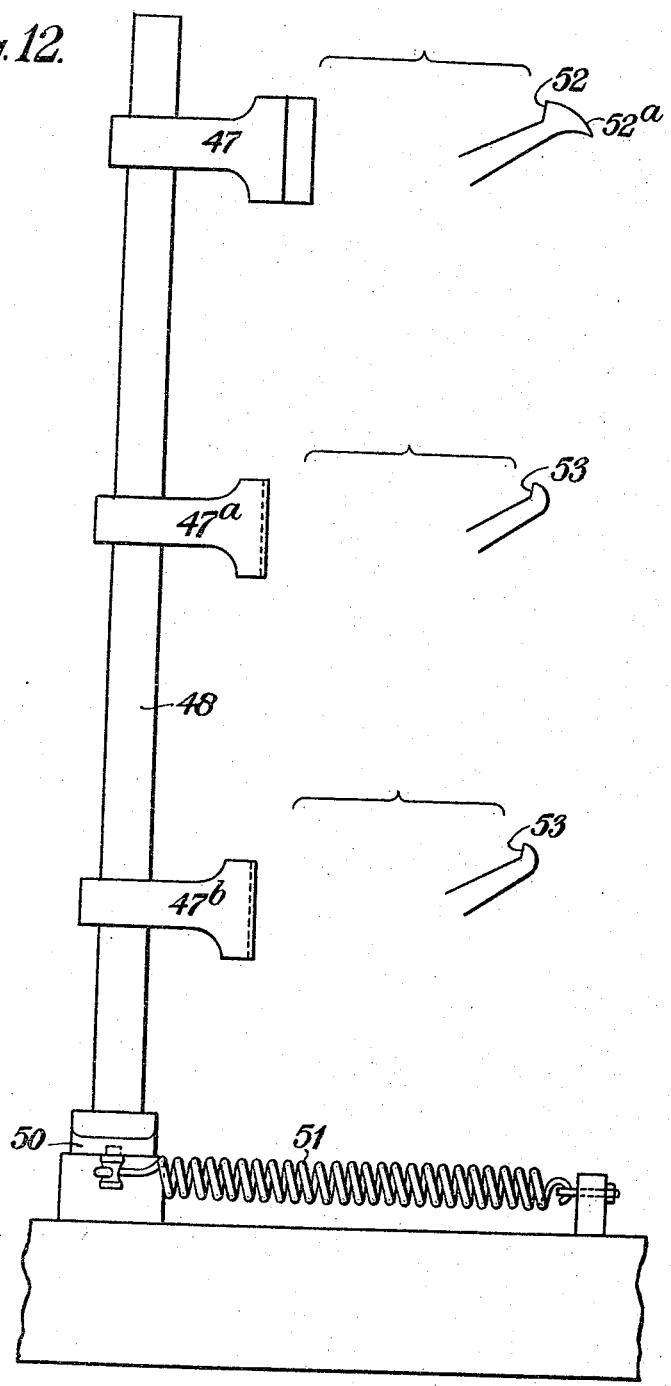

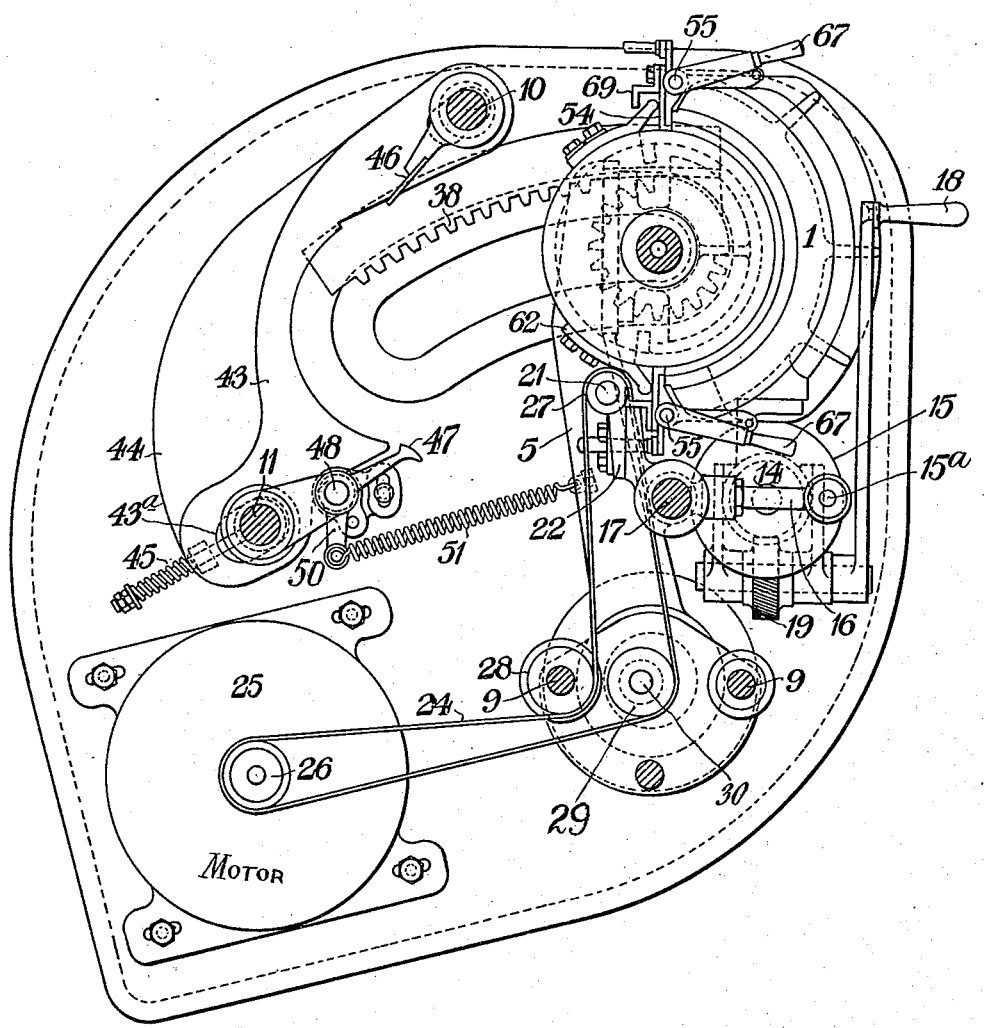

R. C. ANNAND.
APPARATUS FOR THE PRODUCTION OF CURVED STEREOTYPE PLATES.
APPLICATION FILED MAY 26, 1915.

1,185,162.

Patented May 30, 1916.
13 SHEETS—SHEET 12.

Inventor:
Robert Cumming Annand
By Attorneys,
Fraser, Turk & Myers

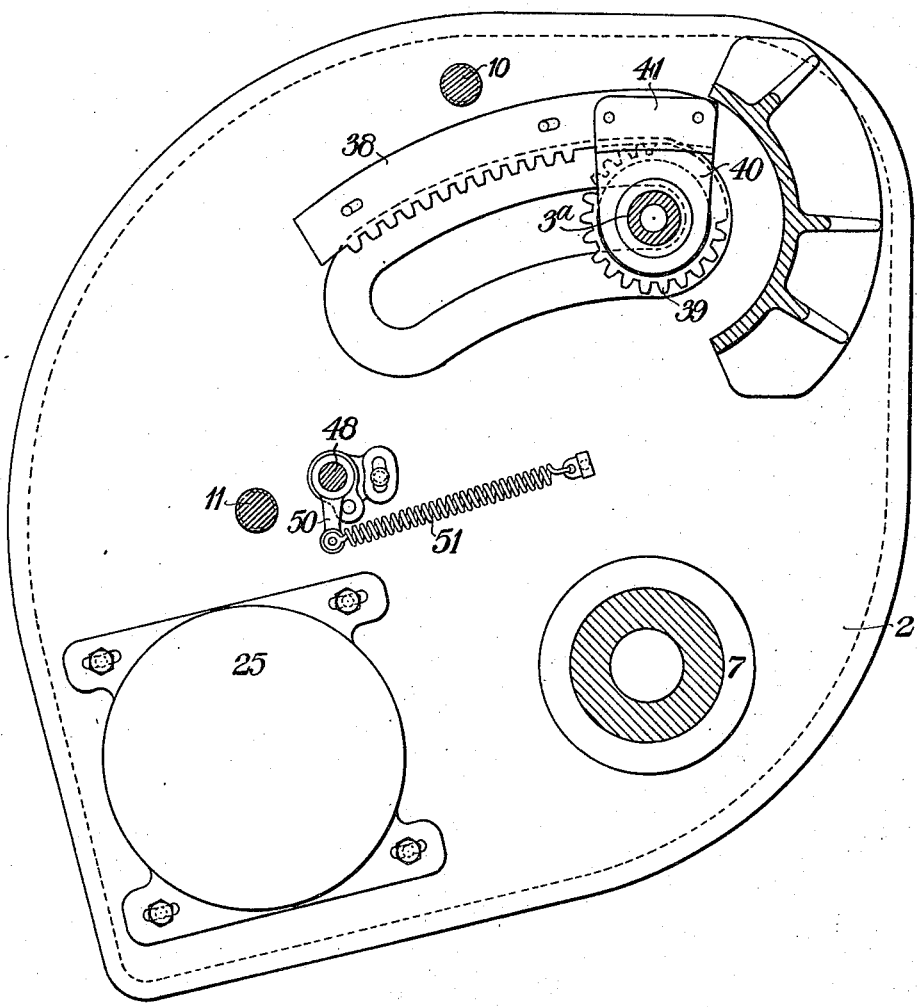

UNITED STATES PATENT OFFICE.

ROBERT CUMMING ANNAND, OF SOUTH SHIELDS, ENGLAND.

APPARATUS FOR THE PRODUCTION OF CURVED STEREOTYPE-PLATES.

1,185,162. Specification of Letters Patent. Patented May 30, 1916.

Application filed May 26, 1915. Serial No. 30,524.

*To all whom it may concern:*

Be it known that I, ROBERT CUMMING ANNAND, subject of the King of Great Britain, residing at Cornwallis street, South Shields, in the county of Durham, England, have invented certain new and useful Improvements in or Relating to Apparatus for the Production of Curved Stereotype-Plates, of which the following is a specification.

The object of this invention is to provide improved mechanism for the production of curved stereotype plates and more particularly semicircular stereotype plates for use in rotary web printing machines.

It is found that the use of entirely automatic plate casting machinery requires more skilled supervision than is usually to be found in the ordinary newspaper printing office. The present invention aims more particularly to provide a combination of mechanism which will reduce plate casting by semi-automatic apparatus to a more simple and reliable operation not beyond the skill available in newspaper printing offices. The invention, however, is not necessarily limited in this respect, and the operation of the machine may be effected more or less automatically according to desire.

The improved plate casting machine belongs to the class that are well known as vertical or upright casting machines, that is to say, wherein the core and casting shell or back are arranged vertically or substantially so.

A special new feature of the present invention is that in combination with a casting shell or back attached in a permanent position to the bedplate of the machine or otherwise arranged to be stationary, a vertical or substantially vertical core is arranged to be swung or moved horizontally or approximately horizontally into and out of the stationary casting shell on arms mounted on a pillar or equivalent support for the purpose of casting the plate and removing it from the casting shell respectively, mechanism being provided to cause the core to turn on its axis in the course of its swing, for the purpose of removing the plate from the core by means of suitable stripping devices. These devices may consist of stops or claws arranged to act on one edge of the plate toward the outer end of the swing and thereby drive off or separate the plate from the core, and of other claws or members adapted to engage and retain the opposite edge of the plate on the return swing.

To facilitate the stripping of the cast plate from the matrix in the casting shell the rotation is preferably imparted to the core after the initial portion of its outward swing, the matrix being stripped from the newly cast plate during this initial portion of the swing, and the core being caused to rotate on its axle so that the side of the core carrying the cast plate is turned away from the casting shell and into such a position that the plate can be automatically driven off the core by coming in contact with the stops or claws above mentioned when the core has nearly reached the end of its outward swing.

In the outward swing the plate on the core may be brought under the action of a saw or cutter for severing the tail or sullage piece, and this cutter may serve at the same time for beveling the end of the plate. Another cutter may also be provided to bevel the other end of the plate in the outward swing of the core. The said cutter or cutters are preferably arranged to swing backward and forward with or to follow the swinging motion of the core, means being provided for driving the cutter or cutters without interfering with the swinging motion.

Further according to the invention the apparatus preferably comprises spring platforms adapted to meet the core when it is nearly at the end of its outward swing, and to be pushed back by the action of the core against the springs, while at the same time the stops or devices above mentioned force the plate off the core, the spring platforms following the core and forcing themselves under the plate and severed tail when the core starts on its return swing, forming a means of delivering the plate and tail and allowing the core to be returned again to casting position.

The swinging of the core into and out of casting position is preferably effected through the medium of a revolving crank disk or crank disks arranged to operate the swinging arms through a link or links or other suitable connection.

The core is preferably made hollow and as it is generally intended only to use one side or half of it for casting the plates, most of the other side is preferably cut away, leaving the core of segmental form or open at the back for cooling purposes as hereinafter described.

The invention comprises other improvements which will appear from the following description.

The accompanying drawings illustrate by way of example a machine constructed to embody the invention.

Figure 2:
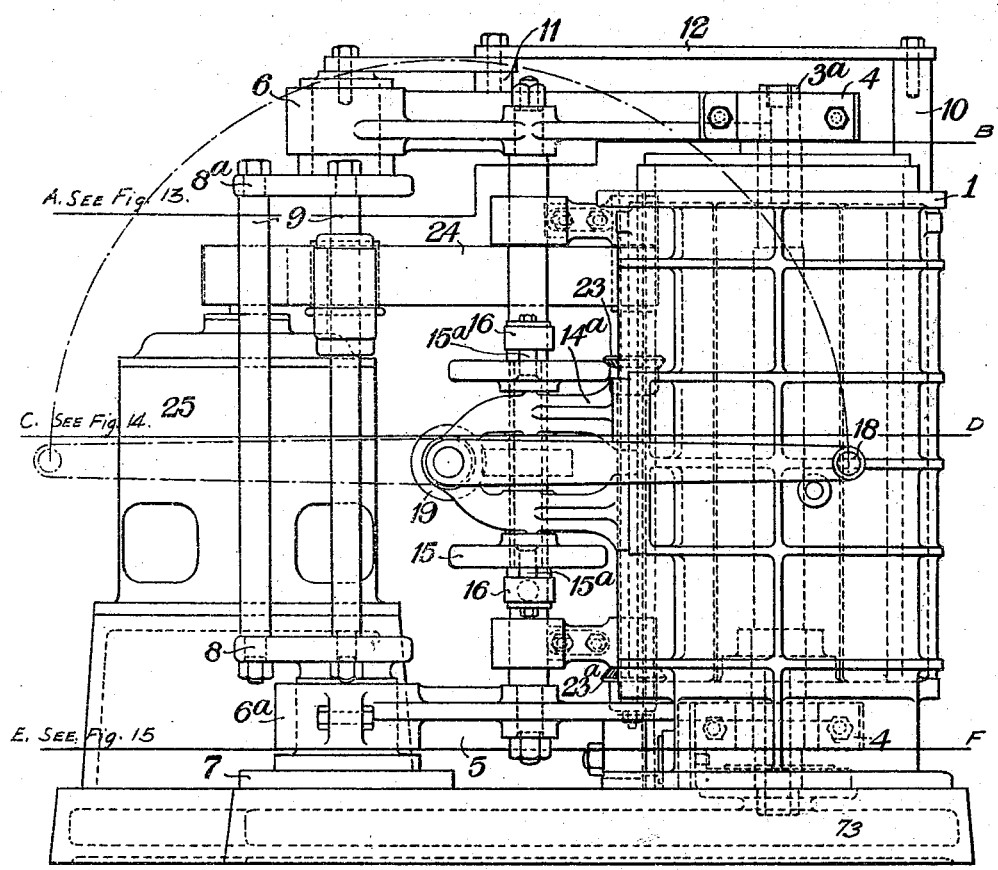
Figure 14:
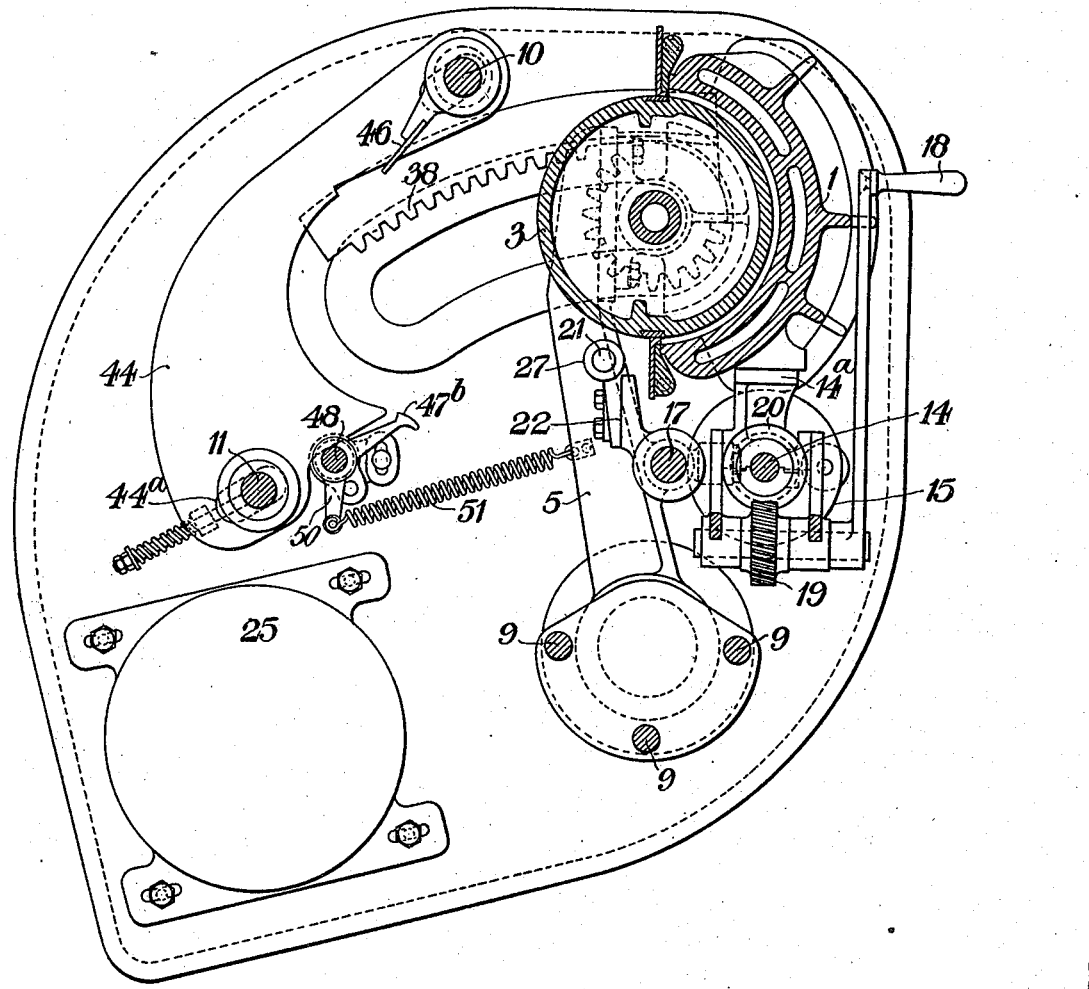

Figure 1 is a plan of the machine; Fig. 2 a rear elevation looking in direction of arrow G, Fig. 1, and Fig. 3 a front elevation looking in direction of arrow H, Fig. 1. Fig. 4 is a side elevation of the machine, looking in direction of arrow K, Fig. 1. Fig. 5 is a detail side view of the casting shell and core, on an enlarged scale, and Figs. 6 and 7 are corresponding back and plan views. Fig. 8 is a diagrammatic detail sectional view showing the core moving away from the casting shell and the matrix stripping from the cast plate. Figs. 9 and 10 are detail views showing different positions of the core and plate in the outward swing. Fig. 11 is a sectional detail view showing spring mounting of one of the belt pulleys hereinafter described for driving the cutter shaft. Fig. 12 is a detail elevation with annexed plan details illustrating the construction and action of the plate retaining claws. Fig. 13 is a horizontal section on line A, B, Fig. 2. Fig. 14 is a horizontal section on line C, D, Fig. 2. Fig. 15 is a horizontal section on line E, F, Fig. 2.

1 indicates the vertical casting back or shell firmly bolted to the bed plate 2 of the machine. 3 is the core mounted on a hollow vertical shaft 3ª in bearings 4 carried on the outer ends of arms 5, 5 arranged to swing on pivots 6, 6ª at the upper and lower ends of a pillar frame. The pillar frame consists of a base or pedestal 7 fixed to the bed plate and formed with the lower pivot 6ª and a supporting plate 8; a cap or head plate 8ª carrying the upper pivot 6; and three vertical stays 9 uniting the upper and lower parts of the pillar frame and secured by nuts.

10 and 11 are two upright pillars bound together at the top by a stay 12, the top of pillar 11 being also united to the upper pivot 6 of the pillar frame by a stay 13. Pillar 10 carries a set of plate knock off fingers referred to later.

14 is an upright shaft mounted in fixed supports attached to side of casting shell as shown at 14ª, Fig. 1 and carrying upper and lower crank disks 15, 15 for imparting the swinging motion to the core arms through the medium of upper and lower links 16, 16 connected at one end to the crank pins 15ª 15ª and at the other to a vertical stay 17 binding together the swinging core arms 5, 5. It is preferred to employ two crank disks and links as described, but one might be used if desired.

In the machine illustrated the crank disks are arranged to be operated by hand by means of a handle 18 through skew wheels 19, 20. Half a revolution of the handle gives half a turn to the crank disks 15 and thereby swings the core over to the delivery position. Half a turn the reverse way or either way brings the core back into casting position in the casting shell.

21 is a saw or cutter spindle rotatably mounted in arms 22 carried on the vertical stay 17, or otherwise suitably arranged so as to follow the core in its swing. The spindle 21 has keyed on it two cutters 23, 23ª, the upper of these serves to cut off the tail or sullage piece, and the lower one 23ª to trim the bottom edge of the plate. The cutters are shown beveled so as to bevel the respective ends of the plate on the core.

The cutter spindle 21 is driven by a belt 24 from a motor 25 on the bed plate, this belt passing around a pulley 26 on the motor shaft, and around guide pulleys 27, 28 and 29 mounted respectively on the cutter spindle 21, one of the pillar frame stays 9 and an upright spindle 30 (see Figs. 1 and 13) carried by an arm (or bracket) 31 mounted on one of the other stays 9. It will be seen that with such an arrangement the core and cutter spindle can be swung backward and forward without unduly stretching the belt. The arm 31 is spring seated so as always to keep the belt tight. The manner in which this can be done is shown in Fig. 11, in which 32 is a collar fixed on the stay 9 and serving to support the bracket 31. The arm or boss of the bracket is bored out to admit a coiled spring 33, the bottom of the bore being closed by a steel stopper ring or collar 34 driven in and formed with a shoulder 35 against which the end of the spring butts. The upper collar 36 fits in the bore of the boss and is also formed with a shoulder 36ª to butt against the top end of the spring; it has a series of toggle holes 36ᵇ to allow of turning it on the stay 9, and a bolt hole is tapped into the stay. A toggle is inserted into one of the toggle holes and the collar 36 is turned to tighten up the spring, a bolt 37 being then passed through one of the toggle holes into the stay 9. The guide pulley 29 being thus spring seated will always keep the belt taut.

The core is caused to rotate in its outward swing, the arrangement for this purpose being such that in the initial portion of the swing, say for a travel of about 3 inches or so, it does not rotate on its axis but is then caused to rotate on its bearings up to the end of the outward swing. This is effected as follows:—On the bed plate of the machine is fixed a circular segment 38 formed with internal teeth adapted to mesh during the required portion of the swing with a mutilated gear wheel 39 keyed on the axle 3ª of the core preferably below the bottom swinging arm 5. The wheel 39 is of sufficiently smaller diameter than the circumference of the core to provide the necessary amount of rotation of the core in its swing.

Attached to the side of the gear wheel 39 is a guide piece 40 (see Figs. 9 and 15) adapted to coöperate with a guide 41 attached to the toothed segment 38. The object of the guide piece and guide is to prevent the core from turning on its axis during the initial portion of the outward swing until the matrix has been sufficiently stripped from the plate on the core. The gear wheel and segment then mesh and the core is caused to turn on its axis to the required extent for effecting the delivery of the plate, say about half a revolution.

Fig. 9 shows these parts and the core and cast plate in the casting position, with the guide piece 40 fully up alongside of the guide 41. Fig. 10 shows at A the position at the end of the initial portion of the swing, the guide piece 40 having passed out of the control of the guide 41 and the first tooth of the wheel entering the toothed segment. The position B shown in Fig. 10 is that when the core has swung out to its full extent.

As the core is swung out and rotated the newly cast plate on the core is carried past the revolving cutters 23, 23ª which separate the tail from the plate and bevel that end and also bevel the bottom end of the plate.

43 is an upper platform and 44 a lower platform, (see Figs. 13 and 14) each pivotally mounted on the knock off finger pillar 10 and also supported on the pillar 11 but so as to be capable of sliding horizontally in relation thereto by means of slots 43ª, 44ª both the platforms being spring-seated by means of springs 45, 45 which keep them pressed up toward the swinging path of the core, these platforms being shaped so that they fit the radius of the ore.

Figure 3:
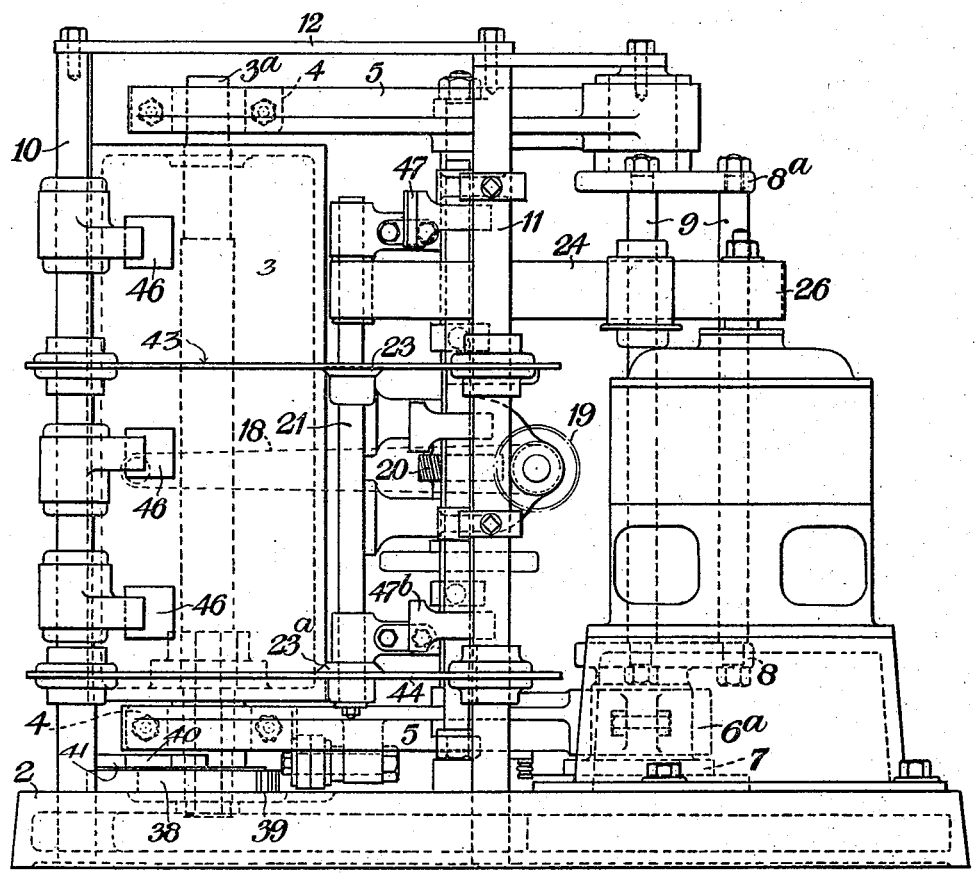
Figure 4:
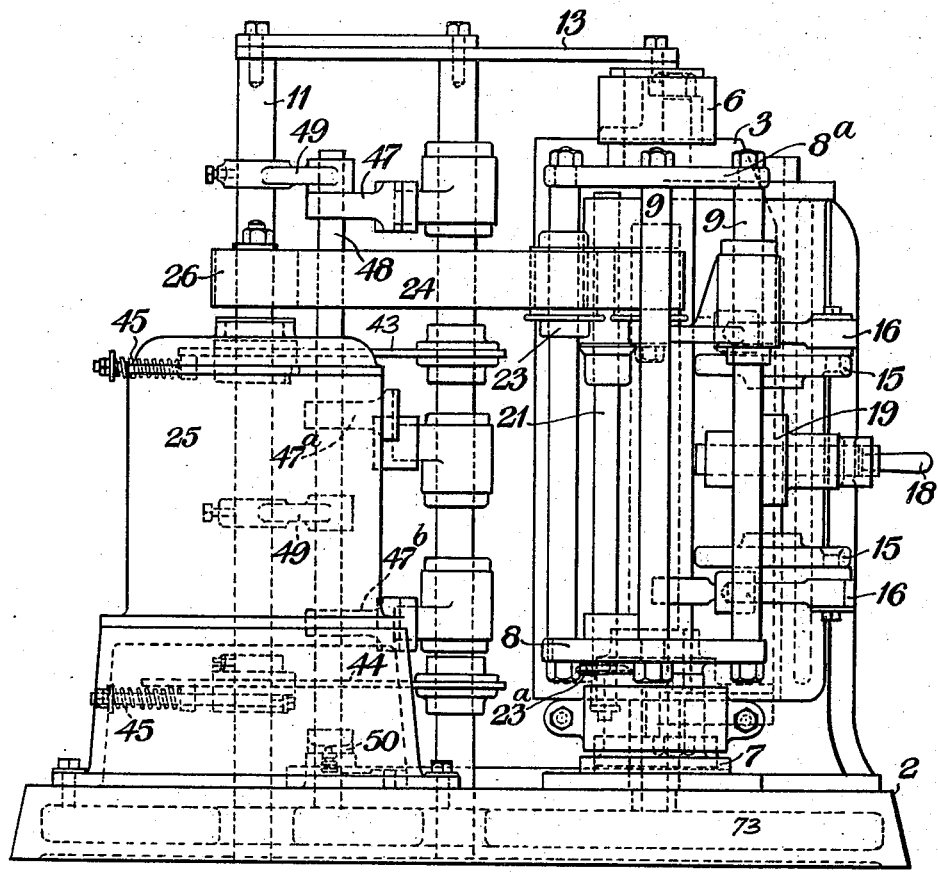

On the pillar 10 are mounted three spring-seated knock off fingers 46 (see Figs. 3, 13 and 14). The way in which they are spring-seated on the pillar 10 may be substantially the same as explained in relation to the spring-seated belt pulley above described. These fingers are so arranged that near the end of the outward swing of the core and after the plate has passed the cutters, the leading edge of the plate and tail come in contact with the fingers in the rotation of the core (see the dotted position Fig. 1) and the fingers force off the plate and tail, while the spring-seated platforms 43, 44 push themselves underneath the plate and tail to receive delivery of them.

47, 47ª, 47ᵇ represent three retaining or restraining claws keyed on a vertical shaft 48, rotatably supported in the bed plate and in arms 49 (Figs. 4 and 13) fixed to the pillar 11. The vertical shaft 48 carries an arm 50 (see Figs. 14, 15) connected by a coiled spring 51 to the bed plate, so that the claws are held up to position to engage the plate as described below. The top claw 47 which engages the edge of the tail of the plate, has a somewhat deeper tooth or shoulder 52 than the plate engaging teeth or shoulders 53, 53 of the claws 47ª, 47ᵇ (see the small detail plan annexed to Fig. 12) and it is also formed with a rubbing surface 52ª. By this means the claw 47 will ride on the surface of the tail of the plate as the plate revolves past the claws 47, 47ª, 47ᵇ in the outward swing of the core, and the spring controlled shaft 48 will be turned slightly outward so that the claws 47ª, 47ᵇ will be held out of contact with the printing surface of the plate as this passes them, the claws then snapping back into position behind the rear edge of the plate and tail, when the core has reached its fullest swing. When the core begins to return to casting position on the reverse or further operation of the handle and consequently rotates in the opposite direction, the claws 47, 47ª, 47ᵇ hold back the plate and tail, the spring platforms 43, 44 pushing themselves underneath the plate and tail which are thus left on the platform while the core returns to position in the casting shell for casting a new plate.

The means illustrated for holding the matrix in casting position in the casting shell and of stripping it automatically from the cast plate to permit of the rotation of the core are on the lines *per se* generally known.

Referring more particularly to Figs. 5 to 8 the side clips for the matrix each consist of two parts or jaws 53', 54' extending the full length of the casting space. The parts 53' are pivoted on trunnions 55, 56 formed or provided at the top and bottom ends of the matrix clips and carried in bearings 53ª fixed to side of casting shell and the parts 54' are attached to the parts 53' by bolt and slot connections 54ª (Fig. 6) to permit the parts 54' to slide inward on the parts 53' to open the jaws for inserting a new matrix as explained later. The jaws 53' are controlled by springs 56ª, 56ª attached at one end to parts 57, 58 in fixed connection with the casting shell and at the other end to arms or levers 59, 60 in connection with the trunnions or hubs of the jaws 53' so that these springs tend to swing the jaws 53', 54' with the matrix clamped between them outward in the direction of travel of the core in its outward swing.

When the core swings into casting position lugs or projections 61, 62 on the core come against the jaws 54', 54' and press the two part side clips back against the action of the springs 56ª, 56ª into the casting position (see Figs. 1 and 7) the matrix gripped between the jaws 53', 54' lying snugly in casting position against the casting back and the inner ends of the jaws 54' closing the sides of the casting space between the core and casting shell; the bottom of the casting space can be closed by a semi-annular segment or stopper plate 610 fixed on the bearing 4 of the lower arm 5 (see Figs. 5 and 8).

In Fig. 8 the core is shown as having left the casting position and the clips 53', 54' have been swung out by their springs which process effectively peels the matrix clipped between them off the cast plate P and so that the core and plate can rotate in the outward swing of the core.

The sliding of the jaw plates 54' on the jaw plates 53' to allow of the insertion and removal of a matrix is effected by means of levers 63, 63 with eccentric bosses working in slots 64, 64 in the jaw plates 54', these levers being connected by links 65, 65 at the respective sides so as to give a parallel motion. Handles 66, 66 are provided on the upper levers 63, 63 for operating the same. By this means the jaw plates 54' can be slid inward on the jaw plates 53' so as to open the jaws sufficiently (say for example $\frac{3}{16}$ inch) for the insertion of a matrix; or outward to grip the matrix between the jaws.

67, 67 are handles subject to the pressure of the springs 56ª that tend to swing the clips 53' 54' outward and by means of which the matrix clips 53', 54' can be swung into and out of casting position by hand.

To insert or change a matrix the clips 53', 54' should first be swung into casting position by the handles 67 and held temporarily in that position, which can be effected by spring or other stops 68. These are gravity stops which are pushed up by hand and held by the pressure of the spring-pressed handles 67, 67. The old matrix having been taken out and the new one slid down from the top, the jaws 54' which have been slid open by means of the handles 66 as described are slid back to grip the side margins of the matrix. When the handles 67, 67 are pulled back for clamping the matrix by the jaws, stops 68 drop out of the way. If the attendant should swing the core in by oversight before the matrix is clamped by the jaws, the stops 68 would be in the way.

Before the core is swung into casting position the side clips 53', 54' should be released so as to spring outward again as otherwise complications might arise regarding the semi-annular segment 610 which closes the bottom of the casting space. In order to insure that this shall be done, lugs or projections 69, 69 (Fig. 7) are provided on the jaw plates 53' in such a position as to be struck by the lugs 61, 62 on the inward swing of the core if the attendant fails to release the clips before closing the core; consequently the core cannot get into casting position until the matrix clips are released.

Referring to Figs. 6 and 7 it will be seen that about half the core is cut away and the core is open at the back except for a binding piece 70 in the middle. The upper and lower ends of the core axle are hollow and formed with a number of lateral perforations 71 at top and 72 at bottom. Cooling water is admitted to the top of the axle from any suitable supply and flows out through the perforations 71 (Fig. 6) into a tray 72ª (Figs. 6 and 7) which distributes it against the back of the casting part of the core, spreads it equally all over the metal and causes it to run down in an even and uniform film to the bottom, where it cools and passes through the holes 72 and through the bottom of the axle. The water from the axle may be collected in the bed plate which may be made hollow for the purpose and as shown at 73 be run off therefrom by suitably located pipes.

The machine is set alongside a melting furnace of any usual or suitable construction, from which metal can be pumped or run into the casting space between the core and casting back in the well known manner.

Recapitulating the operation:—The core being in casting position the metal is pumped or run into the casting space between the core and casting back. As soon as the cast plate has cooled sufficiently the attendant gives a half turn to the handle, thus swinging out the core through the medium of the crank disks 15 and links 16. The matrix clips 53', 54' swing out under the action of their springs and strip the matrix from the plate in the initial portion of the outward swing of the core before this begins to revolve under the action of the gear wheel 39 and toothed segments 38. The core then rotates and in this rotation the cutters that swing with the core sever the tail and bevel the ends of the plate. After this has taken place the leading edge of the plate in the rotation of the core comes against the spring knock off fingers 46 which force the plate and tail off the core, and the spring retaining claws 47, 47ª, 47ᵇ drop in behind the plate and tail. On the backward swing of the core by the attendant by means of the handle, the retaining claws hold back the plate and tail and the spring-seated platforms push themselves under the plate and tail to complete the delivery of same the core returns to casting position in the casting shell, pushing the spring controlled matrix clips back to return and hold the matrix in position therein for the next cast.

I do not confine myself to the details of the particular machine described and illustrated, which may be varied considerably within the spirit of the invention. In particular the mechanism for imparting the movements to the core, for separating the plate from the core, for severing the tail and for receiving the plate and tail may be varied, and any other suitable means may be employed for securing the matrix in position and enabling it to strip from the plate.

As the core is carried in arms working from a pivot or pillar it will be seen that it can be swung horizontally into and out of casting position easily and without balance weights or other compensating devices such as are required in the case of machines with horizontally mounted cores.

It is preferred to employ a semicircular or segmental core, but a cylindrical or complete core might be employed within the scope of the present invention.

What I claim and desire to secure by Letters Patent is:—

1. Apparatus for casting semicircular or curved stereotype plates, comprising in combination a stationary upright casting shell, an upright core, arms in which said core is carried, a support on which said arms are pivotally mounted, whereby the core can be swung transversely to the casting shell into and out of casting position therein, stripping devices for acting on the cast plate on the core, and mechanism for causing the core to turn on its axis in the course of its swing, in order to subject it to the action of said stripping devices.

2. Apparatus for casting semicircular or curved stereotype plates, comprising in combination a stationary upright casting shell, an upright core, arms in which said core is carried, a support on which said arms are pivotally mounted, whereby the core can be swung transversely to the casting shell into and out of casting position therein, mechanism for causing the core to turn on its axis in the course of its swing, and knock-off devices adapted to act on an edge of the cast plate in the rotation of the core when this has nearly reached the end of its outward swing and thereby force the plate away from the core.

3. Apparatus for casting semicircular or curved stereotype plates, comprising in combination a stationary upright casting shell, an upright core, arms in which said core is carried, a support on which said arms are pivotally mounted, whereby the core can be swung transversely to the casting shell into and out of casting position therein, means for swinging the core into and out of the casting shell and mechanism adapted to impart rotation to the core on its axis after the initial portion of its outward swing and knock off devices adapted to act on an edge of the cast plate in the rotation of the core when this has nearly reached the end of its outward swing and thereby force the plate away from the score.

4. Apparatus for casting semicircular or curved stereotype plates, comprising in combination a stationary upright casting shell, an upright core, arms in which said core is carried, a support on which said arms are pivotally mounted, whereby the core can be swung transversely to the casting shell into and out of casting position therein, means for swinging the core into and out of the casting shell on said arms, means for stripping the matrix automatically from the cast plate during the initial portion of the outward swing of the core, mechanism adapted to impart rotation to the core on its axis after the initial portion of its outward swing, and knock-off devices adapted to act on an edge of the cast plate in the rotation of the core when this has nearly reached the end of its outward swing and thereby to force the plate away from the core.

5. Apparatus for casting semicircular or curved stereotype plates, comprising in combination a stationary upright casting shell, an upright core, arms in which said core is carried, a support on which said arms are pivotally mounted, whereby the core can be swung transversely to the casting shell into and out of casting position therein, means for swinging the core into and out of the casting shell, mechanism for causing the core to turn on its axis in the course of its swing, knock-off devices adapted to act on one edge of the cast plate in the rotation of the core when this has nearly reached the end of its outward swing and thereby force the plate away from the core, and retaining devices adapted to engage the opposite edge of the plate and to hold the plate back in the return swing and reverse rotation of the core, and thereby complete the removal of the plate from the core.

6. Apparatus for casting semicircular or curved stereotype plates, comprising in combination a stationary upright casting shell, an upright core, arms in which said core is carried, a support on which said arms are pivotally mounted, whereby the core can be swung transversely to the casting shell into and out of casting position therein, means for swinging the core into and out of the casting shell, mechanism for causing the core to turn on its axis in the course of its swing, knock-off devices adapted to act on one edge of the cast plate in the rotation of the core when this has nearly reached the end of its outward swing and thereby force the plate away from the core, an upright shaft, plate retaining claws mounted on said shaft and adapted to engage the opposite edge of the plate and to hold the plate back in the return swing and reverse rotation of the core and thereby complete the removal of the plate from the core, spring means acting on said upright shaft and tending to hold said claws in their plate-retaining position, a rubbing face on the top plate retaining claw adapted to ride on the cast tail of the plate in the revolution of the plate past the claws and thereby to turn the upright shaft against the action of said spring means and to hold the other claws out of contact with the printing surface of the revolving cast plate, substantially as described.

7. Apparatus for casting semicircular or curved stereotype plates, comprising in combination a stationary upright casting shell, an upright core, arms in which said core is carried, a support on which said arms are pivotally mounted, whereby the core can be swung transversely to the casting shell into and out of casting position therein, means for swinging the core into and out of the casting shell, mechanism for causing the core to turn on its axis in the course of its swing, knock-off devices adapted to act on one edge of the cast plate in the rotation of the core when this has nearly reached the end of its outward swing and thereby force the plate away from the core, retaining devices adapted to engage the opposite edge of the plate and to hold the plate back in the return swing and reverse rotation of the core, and thereby complete the removal of the plate from the core, and a spring platform adapted to force itself under the plate by its spring action and thereby receive the plate stripped from the core by the said knock-off and plate retaining devices.

8. Apparatus for casting semi-circular or curved stereotype plates, comprising in combination a stationary upright casting shell, an upright core, arms in which said core is carried, a support on which said arms are pivotally mounted, whereby the core can be swung transversely to the casting shell into and out of casting position therein, means for swinging the core into and out of the casting shell, mechanism adapted to impart rotation to the core on its axis during its swinging motion, a driven cutter adapted to sever the tail from the cast plate during the outward swing and revolution of the core, and knock-off devices adapted to act on an edge of the cast plate and tail in the rotation of the core when this has nearly reached the end of its outward swing and after the severing of the tail.

9. Apparatus for casting semicircular or curved stereotype plates, comprising in combination a stationary upright casting shell, an upright core, arms in which said core is carried a support on which said arms are pivotally mounted, whereby the core can be swung transversely to the casting shell into and out of casting position therein, means for swinging the core into and out of the casting shell, mechanism adapted to impart rotation to the core on its axis, during its swinging motion, a driven cutter adapted to follow the core in its swinging motion and to sever the tail from the cast plate during the outward swing and revolution of the core, and knock-off devices adapted to act on an edge of the cast plate and tail in the rotation of the core when this has nearly reached the end of its outward swing and after the severing of the tail.

10. Apparatus for casting semicircular or curved stereotype plates, comprising in combination a stationary upright casting shell, an upright core, arms in which said core is carried a support on which said arms are pivotally mounted, whereby the core can be swung transversely to the casting shell into and out of casting position therein, means for swinging the core into and out of the casting shell, mechanism adapted to impart rotation to the core on its axis during its swinging motion a driven cutter adapted to sever the tail from the cast plate during the outward swing and revolution of the core, knock-off devices adapted to act on an edge of the cast plate and severed tail in the rotation of the core when this has nearly reached the end of its outward swing, and thereby force the plate and tail away from the core, retaining devices adapted to engage the opposite edge of the plate and to hold the plate back in the return swing and reverse rotation of the core and thereby complete the removal of the plate from the core and spring platforms, adapted to force themselves by their spring action respectively under the plate and severed tail and thereby receive the plate and tail stripped from the core by the said knock-off and plate-retaining devices.

11. Apparatus for casting semi-circular or curved stereotype plates, comprising in combination a stationary upright casting shell, an upright core, arms in which said core is carried, a support on which said arms are pivotally mounted, whereby the core can be swung transversely to the casting shell into and out of casting position therein, means for swinging the core into and out of the casting shell, mechanism adapted to impart rotation to the core on its axis during its swinging motion, a driven cutter adapted to sever the tail from the cast plate during the outward swing and revolution of the core, knock-off devices adapted to act on an edge of the cast plate and severed tail in the rotation of the core when this has nearly reached the end of its outward swing and thereby force the plate and tail away from the core, retaining devices adapted to engage the opposite edge of the plate and to hold the plate back in the return swing and reverse rotation of the core and thereby complete the removal of the plate from the core, and spring platforms adapted to be pushed back against their spring action by the core near the end of its outward swing, and to follow the core under their spring action and force themselves under the plate and severed tail when the core starts on its return swing, thereby receiving the plate and tail stripped from the core by the knock-off and plate retaining devices.

12. Apparatus for casting semicircular or curved stereotype plates, comprising in combination a stationary upright casting shell, an upright core, arms in which said core is carried, a support on which said arms are pivotally mounted and means for swinging the core transversely to the casting shell into and out of casting position therein, said means comprising rotary crank disks, links connecting said crank disks to said arms, and means for imparting rotation to said crank disks.

13. Apparatus for casting semicircular or curved stereotype plates, comprising in combination a stationary upright casting shell, an upright core of open backed segmental form, an upright axle carrying said core, arms in which said core is carried, a support on which said arms are pivotally mounted, mechanism for swinging the core transversely to the casting shell into and out of casting position therein, means for supplying cooling water to the axle of the core and means for distributing the water from the axle in an even film over the back of the casting face of the open backed segmental core, substantially as described.

14. Apparatus for casting semicircular or curved stereotype plates, comprising in combination a stationary upright casting shell, an upright core, arms in which said core is carried, a support on which said arms are pivotally mounted, whereby the core can be swung transversely to the casting shell into and out of casting position therein, means for swinging the core into and out of the casting shell and mechanism adapted to impart rotation to the core on its axis after the initial portion of its outward swing, stripping devices adapted to strip the matrix automatically from the cast plate on the core in the initial portion of the outward swing of the core, and knock-off devices adapted to act on an edge of the cast plate in the rotation of the core when this has nearly reached the end of its outward swing and thereby force the plate away from the core.

15. Apparatus for casting semicircular or curved stereotype plates, comprising in combination a stationary upright casting shell, an upright core, arms in which said core is carried, a support on which said arms are pivotally mounted, whereby the core can be swung transversely to the casting shell into and out of casting position therein, means for swinging the core into and out of the casting shell and mechanism adapted to impart rotation to the core on its axis after the initial portion of its outward swing and retaining devices adapted to engage the opposite edge of the plate and to hold the plate back in the return swing and reverse rotation of the core and thereby complete the removal of the plate from the core.

In witness whereof I have hereunto signed my name in the presence of two subscribing witnesses.

ROBERT CUMMING ANNAND.

Witnesses:
   E. H. BARCLAY,
   J. C. THOMAS.

Copies of this patent may be obtained for five cents each, by addressing the "Commissioner of Patents, Washington, D. C."